United States Patent [19]
Latka et al.

[11] 3,881,076
[45] Apr. 29, 1975

[54] STEERING COLUMN VEHICLE SWITCH ASSEMBLY HAVING ROTARY AND LINEAL MOVEMENT

[75] Inventors: Thomas L. Latka, Taylor; Glenn L. Peck, Jr., Flint, both of Mich.

[73] Assignee: Ford Motor Company, Dearborn, Mich.

[22] Filed: Apr. 12, 1974

[21] Appl. No.: 460,656

[52] U.S. Cl. .............................................. 200/61.54
[51] Int. Cl. .............................................. H01h 9/00
[58] Field of Search ....... 200/4, 61.27, 61.54–61.57, 200/61.85–61.88, 156, 157, 161, 275, 329–332, 335; 15/250.02, 250.04, 250.12, 250.17, DIG. 10; 74/471 R, 471 XY, 502, 503, 504, 510

[56] References Cited
UNITED STATES PATENTS

| | | | |
|---|---|---|---|
| 2,834,978 | 5/1958 | Harrison | 15/250.02 |
| 2,940,109 | 6/1960 | Weymouth, Jr. | 200/4 X |
| 3,187,117 | 6/1965 | Dyksterhouse | 200/275 X |
| 3,481,422 | 12/1969 | Mueller et al. | 200/61.54 X |
| 3,499,125 | 3/1970 | Stoi | 200/61.54 X |
| 3,511,943 | 5/1970 | Kibler | 200/61.54 X |

*Primary Examiner*—James R. Scott
*Attorney, Agent, or Firm*—Robert W. Brown; Keith L. Zerschling

[57] ABSTRACT

A switch assembly for a vehicle having a steering column. The switch assembly is capable of producing rotary and lineal movement of a switch member and includes a post mounted on the steering column for pivotal movement about an axis substantially parallel to the axis of the steering column. The post has an arcuate passage extending through it. A shank, having a passage extending through it, is attached to the post with one end of the shank passage in alignment with one end of the arcuate passage in the post. A rod is located within the shank and a handle assembly is attached to the shank and coupled to the rod to permit rotation and longitudinal movement of the rod relative to the shank passage. A switch has a housing attached to the steering column at a location spaced from the post and a conduit interconnects the switch housing and the post. A cable is connected at one of its ends to the rod in the shank and extends through the arcuate passage in the post, through the conduit, and to a movable member within the switch housing. Rotary and longitudinal movement of the rod in the shank produces corresponding movement of the movable switch member. In the preferred form, the post, shank and handle assembly are part of the vehicle turn signal mechanism and the switch controlled by longitudinal and rotational movement of the rod is used to control the vehicle windshield wiper and washer system.

8 Claims, 12 Drawing Figures

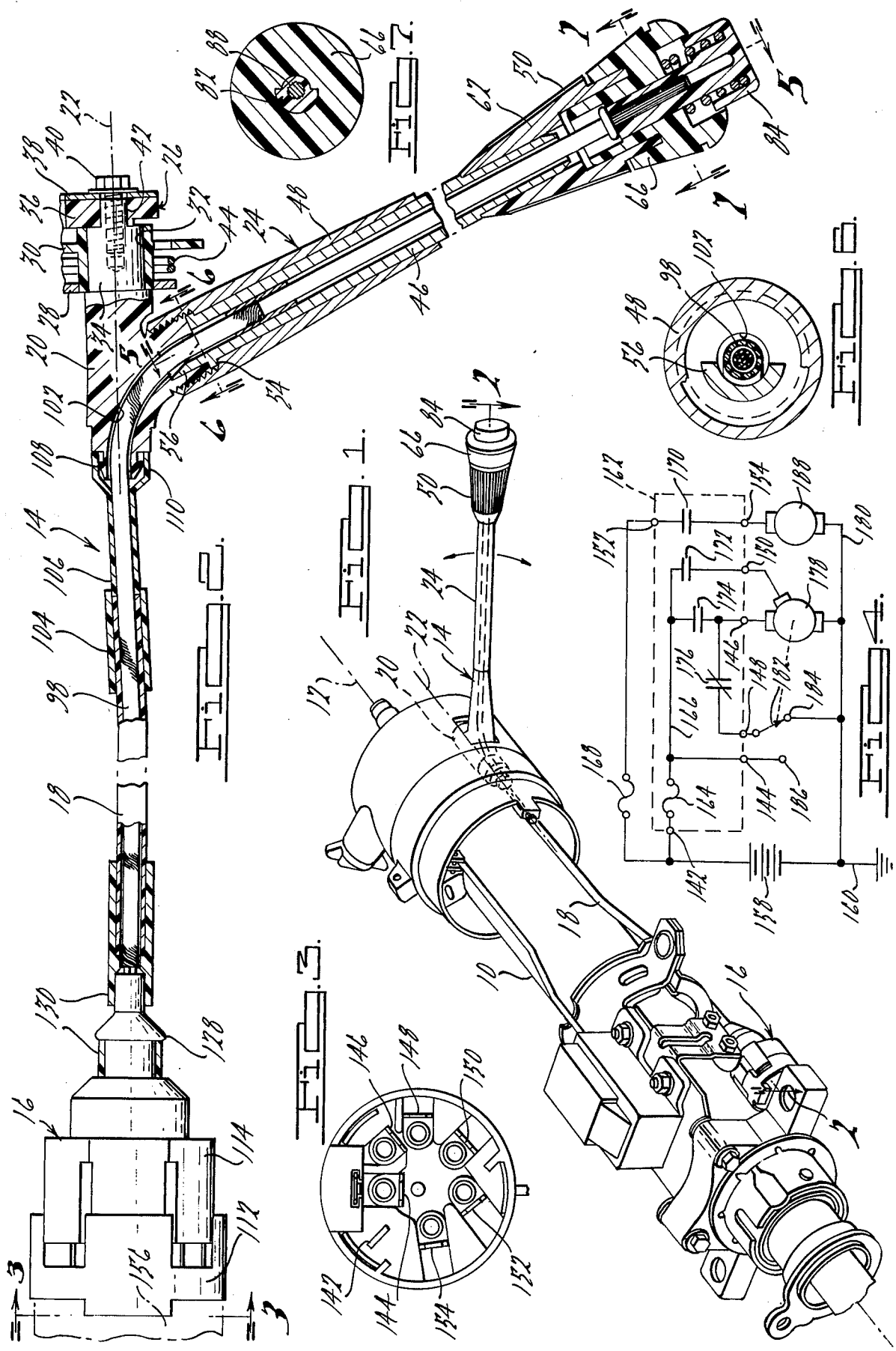

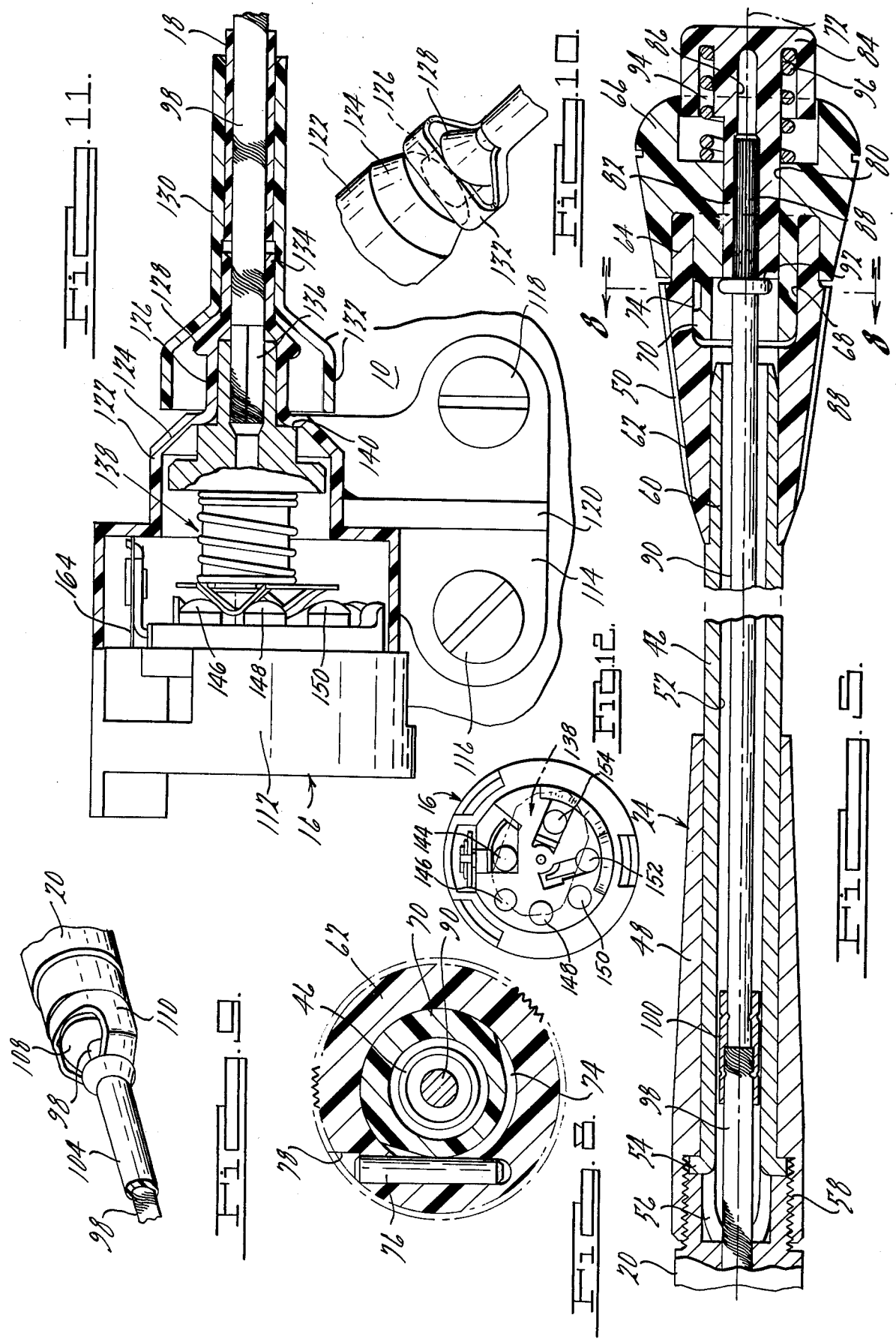

STEERING COLUMN VEHICLE SWITCH ASSEMBLY HAVING ROTARY AND LINEAL MOVEMENT

This invention relates to a switch assembly for use in a motor vehicle having a steering column. The switch assembly is particularly suitable for use as a windshield wiper and washer control mechanism.

The following U.S. Patents are illustrative of prior art switch assemblies: U.S. Pat. Nos. 3,671,691 to Suzuki et al.; 3,511,943 to Kibler; 3,374,321 to Trarbach; 3,221,119 to Weathers et al.; 3,187,117 to Dyksterhouse; 2,912,873 to Little; and 2,834,978 to Harrison. Of these, the Suzuki et al., Kibler and Dyksterhouse patents appear to be the most pertinent.

The typical motor vehicle windshield wiper and washer switch is mounted within the passenger compartment of the vehicle and on the instrument panel. The switch usually controls a two-speed wiper motor. Rotation of the switch from an off position to a low-speed position causes the wiper motor to rotate at a first speed and a further rotation of the switch to a high-speed position causes the wiper motor to rotate at a higher speed. Typically, the wiper-washer switch has a knob or a button in the knob which may be depressed to actuate a windshield-washer pump motor. Such windshield-washer switches are connected by six or seven electrical lead wires to the wiper motor and washer pump motor.

SUMMARY OF THE INVENTION

In accordance with the present invention, a switch assembly comprises a post mounted on the steering column of a motor vehicle. The post is pivotal about an axis substantially parallel to the axis of the steering column and the post has an arcuate passage extending through it. Pivotal movement of the post about its axis may be used for control of the vehicle turn signal mechanism. A shank is coupled to and extends from the post such that movement of the shank produces rotation of the post about its axis. The shank has a longitudinal passage within it. One end of the shank passage is in alignment with one end of the arcuate passage in the post. A rod is located within the shank passage. A handle assembly, coupled to the shank and to the rod, is provided to permit rotational movement of the rod within the shank passage and to permit longitudinal movement of the rod within the shank passage.

A switch has a housing mounted on the steering column at a location spaced from the location at which the post is mounted on the steering column. The switch has a movable member within its housing, the movable member being rotatable and lineally movable relative to the switch housing to effect changes in the electrical switching condition of the switch. A conduit is connected at one of its ends to the switch housing and at its other end to the post. Thus, the latter end of the conduit is in alignment with the other end of the arcuate passage in the post. A flexible cable is coupled to the movable switch member and to the rod within the shank. The flexible cable extends through the conduit, through the arcuate passage in the post and into the shank passage where it connects to the rod. Rotational movement of the rod is transmitted through the cable to the movable switch member to produce rotation of it, and lineal or longitudinal movement of the rod is transmitted through the cable to the movable switch member resulting in its lineal movement.

Preferably, the switch is located within the engine compartment of the vehicle and is connected to the windshield-wiper and washer pump motor located therein. The turn signal lever, comprised of the post, shank and handle assembly, is located within the vehicle's passenger compartment. This is advantageous in that the electrical connections are confined to the vehicle engine compartment and may be made at final vehicle assembly. However, the turn signal mechanism and windshield wiper-washer actuator, including the conduit, flexible cable, and switch may be mounted on the vehicle steering column as a complete-unit subassembly. The difficulty of routing the previously mentioned six or seven electrical lead wires from the engine compartment to the passenger compartment at vehicle assembly is eliminated.

The invention may be better understood by reference to the detailed description which follows and to the drawings.

BRIEF DESCRIPTION OF THE DRAWINGS

FIG. 1 is a pictorial view of the steering column assembly including a switch assembly in accordance with the invention;

FIG. 2 is a sectional plan view of the switch assembly shown in FIG. 1, the section being taken along the lines 2—2 in FIG. 1;

FIG. 3 is an end view of the switch, as indicated by the line 3—3 in the switch assembly show in FIG. 2;

FIG. 4 is a schematic electrical diagram of a vehicle windshield wiper-washer system including the switch shown in FIGS. 2 and 3;

FIG. 5 is an enlarged sectional view, taken along the line 5—5 in FIG. 2, of the shank and handle assembly portions of the switch assembly;

FIG. 6 is an enlarged sectional view taken along the line 6—6 in FIG. 2;

FIG. 7 is a sectional view taken along the line 7—7 in FIG. 2;

FIG. 8 is an enlarged sectional view taken along the line 8—8 in FIG. 5;

FIGS. 9 and 10 are pictorial views of conduit connectors;

FIG. 11 is a partial section view of the switch and its connections to a conduit and flexible cable within the conduit; and FIG. 12 is a right end view of a portion of a switch 16 shown in sectional elevation in FIG. 11.

DETAILED DESCRIPTION

With reference now to the drawings, wherein like numerals refer to like parts in the several views, there is shown in FIGS. 1 and 2 a steering column of a motor vehicle. The steering column typically extends from the passenger compartment of the motor vehicle into its hood or engine compartment. The steering column has an axis 12. A switch assembly, generally designated by the numeral 14, is mounted on the steering column. The switch assembly 14 includes a switch 16 mounted on the steering column 10, a conduit 18 interconnecting the switch 16 and a turn signal post 20 which is mounted on the steering column in spaced relation to the switch 16 and which is pivotal about an axis 22 substantially parallel to the steering column axis 12. A turn signal lever assembly 24 is coupled to the post 20.

A turn signal switch mechanism 26, only a portion of which is shown, has a metal plate 28 rigidly secured to a non-conductive electrical contact support member 30 which carries the stationary contacts (not shown) of the turn signal switch mechanism. The plate 28 and member 30 are rigidly secured to the steering column 10. The member 30 has a cylindrical opening 32 which forms a bearing in which a cylindrically shaped portion 34 of the post 20 is journaled. A non-conductive plate 36, which may carry the movable electrical contacts of the turn signal switch mechanism, and a plate 38 are rigidly secured to one another. A screw 40 secures the post 20 and the plates 36 and 38 to the stationery member 30. The end 42 of the post 20 is keyed to the plates 36 and 38 such that rotation of the post 20 in the bearing 32 and about its axis 22 causes the plates 36 and 38 also to pivot about the axis 22. A spring 44 urges the post 20 and plates 36 and 38 toward a neutral turn signal position.

The lever or shank assembly 24 includes a shank 46 which is coupled by a shank sleeve 48 to the post 20. Movement of the shank or lever assembly 24 in the directions indicated by the arrows in FIG. 1 causes the post 20 and plates 36 and 38 to pivot about the post axis 22. The lever assembly 24 has a handle assembly 50 attached to the shank 46.

The detailed construction of the lever assembly 24 may best be seen in FIG. 5. The shank 46 preferably is formed from tubular steel and has a longitudinal passage 52 extending through its length. A collar 54 is formed at one end of the shank and has a larger diameter than the remaining portion of the shank. This end of the shank also has a tapered extension 56, the overall configuration of which may be ascertained by reference to FIGS. 2 and 6. The tapered extension is received in a recess in the post 20, locates the shank 46 and prevents its rotation relative to the post. The sleeve 48 engages the collar 54 of the shank 46 and is in threaded engagement at 58 with the post 20, thereby, to rigidly secure the shank 46 to the post 20.

The opposite end of the shank 46 has a reduced diameter and preferably serrated portion 60 on which a conically-shaped stationary member 62 of the handle assembly is press fit. The exterior surface of the stationary member 62 is serrated, as may best be seen in FIG. 8, to facilitate its being grasped by the vehicle operator.

The stationary member 62 of the handle assembly 50 has a cylindrical flange 64 about which a member 66 of the handle assembly 50 is rotatable. The flange 64 forms a cylindrical opening 68 in the stationary member 62. The rotatable member 66 has a cylindrical portion 70 which projects longitudinally, that is, parallel to the axis 72 of the lever or shank assembly 24, into the cylindrical opening 68. A groove 74 extends partially around the circumference of the projecting portion 70 of the rotatable member 66. A pin 76 (FIG. 8) is press fit in an opening 78 in the stationary member 62, this opening being in alignment with the groove 74. The pin 76 limits the rotation of the rotatable member 66, relative to the stationary member 62, to an amount less than one revolution.

The rotatable member 66 of the handle assembly 50 has an opening 80 into which a projection 82 of a push-button 84 extends. The projection 82 and the opening 80 have a cross-sectional configuration in the form of two semi-circles of different diameters, as may best be seen in FIG. 7. This design keys the push-button 84 to the rotatable member 66 such that the push-button 84 rotates with and not relative to the rotatable member 66. The push-button 84 has a central opening 86 into which the serrated end 88 of a steel rod 90 is press fit. A collar 92 on the rod 90 abuts the projection 82 of the push-button. The push-button 84 has a recess 94 within which is positioned a compression spring 96 which engages the rotatable member 66 of the handle assembly 50 and the push-button 84 urging the latter toward the right as viewed in FIG. 5. Of course, this urges the rod 90 in a direction away from the post 20. Preferably, the stationary member 62, the rotatable member 66 and the push-button 84 of the handle assembly 50 are made from acrylonitrile butadiene styrene (ABS) platic.

The opposite or left-hand end, as viewed in FIG. 5, of the rod 90 is connected to a flexible steel cable 98 with a tubular steel coupling 100 which is crimped to both the rod 90 and the cable 98. Preferably, the flexible cable 98 is made from SAE 1055–1080 steel flexible cable wire and may comprise a central core of a plurality of steel wires surrounded by two layers of steel wire helically wound in opposite directions around the central core. The steel cable 98 must have torsional resistance sufficient to enable rotation of its end connected to the rod 90 to produce a substantially corresponding rotational movement at its end coupled to the switch 16. The flexible cable 98 also transmits lineal movement of the rod 90 to the switch 16.

The cable 98 extends from its connection to the rod 90 in the passage 52 of the shank 46 to the post 20. The post 20 has an arcuate passage 102 one end of which is alignment with the passage in the shank 46 and the other end of which is alignment with the conduit 18. The flexible cable 98 extends through an upper conduit connector 104, which has a reduced diameter section 106 that forms an extension of the conduit 18. The upper conduit connector 104 is sonically welded to the conduit 18 and couples the conduit 18 to a frusto-conically-shaped flange or collar 108 on the post 20. The connector 104 has an enlarged-diameter, ovally-shaped, quick-connect end 110 with cutout portions which permit it to be slipped over and to engage the flange 108, thereby, to couple the conduit 18 to the post 20, as may be best seen in FIG. 9.

As may best be seen in FIGS. 2 and 11, the switch 16 has a housing formed from an electrically non-conductive member 112 and a second preferably metal member 114. The housing member 114 is secured to the steering column 10 by screws 116 and 118. A rib 120 provides added strength for the housing member 114.

The housing member 114 has a round extending portion 122 which tapers at 124 toward a reduced-diameter groove 126 defined by a larger diameter frusto-conically-shaped flange or collar 128 similar in design to the flange or collar 108 on the post 20. A lower conduit connector 130 is sonically welded to the conduit 18 and couples the conduit 18 to the housing member 114. This is accomplished with an enlarged diameter, ovally-shaped, quick-connect portion 132 which has cutout portions permitting the conduit connector 130 to grasp the flange or collar 128 to couple the conduit 18 to the switch housing member 114.

The switch housing member 114 has an opening in its end 134 which receives one end of the flexible cable 98. The end 136 of the flexible cable is of square cross-section and is received by an opening of similar cross-section in a movable member 138 in the switch housing. The movable member 138 abuts the switch housing member 114 at the flange 140. The member 138 is capable of both rotary movement, in response to rotation of the cable 98, and lineal movement, in response to longitudinal movement of the cable 98 in the conduit 18. Rotational and lineal movement of the movable member 138 of the switch results in changing of the electrical switching conditions within the switch. The switch 16 in function and general switching arrangement may be similar to those switches currently employed in many motor vehicles, that is, rotation of the switch from a first position to a second position opens one set of contacts and closes another set. A third set of contacts closes when the member 138 is rotated to a third position, and a fourth set of contacts closes when the member 138 moves lineally. Switches capable of performing in the specified manner are commercially available from Essex International, Inc., and other manufacturers.

FIG. 3 is an end view of the switch housing member 112 and shows seven spade-type electrical connectors 142, 144, 146, 148, 150, 152 and 154. A plug, indicated by the dot-dash lines 156, in FIG. 2, mate with the spade connectors.

With reference now to FIG. 4, there is shown a schematic electrical diagram of a windshield wiper-washer system for a motor vehicle. The circuit includes a DC source of electrical energy 158, such as a storage battery, having its negative terminal connected at 160 to ground. The switch 16 comprises the circuit elements included within the broken lines 162. The positive terminal of the DC source is connected to the switch terminal 142 and, through a fuse 164, to a voltage supply lead 166. The positive lead of the Dc source 158 also is connected through a fuse 168 to the switch terminal 152. A set of contacts 170 is connected between these switch terminals 152 and 154. A second set of contacts 172 is connected between the lead 166 and the switch terminal 150. Similarly, a third set of contacts 174 is connected between the lead 166 and the switch terminal 146. A fourth set of contacts 176 is connected between the terminals 146 and 148. The switch contacts are shown in their state as of the time the switch 16 is in a first or "off" position.

A two-speed windshield wiper motor 178 has one of its terminals connected to the switch terminal 146, has a second terminal connected to the switch terminal 150, and has a third terminal connected to a ground lead 180. The wiper motor 178 has a mechanical connection with a switch 182 which is in the position shown in FIG. 4, that is, in contact with a ground terminal 184, when the windshield wipers are off or in a "part" position. Otherwise, the switch 182 contacts a terminal 186 connected to the voltage supply lead 166. A windshield washer pump motor 188 has one of its terminal connected to the switch terminal 154 and has its other terminal connected to the ground lead 180.

When the rotatable handle assembly member 66 is turned from a first or off position to a second position, the rod 90 and flexible cable 98 rotate a corresponding amount and this produces rotation of the movable switch member 138. This causes electrical contacts 176 to open and closes electrical contacts 174. Voltage from the DC source 158 is applied through the fuse 164, lead 166 and contacts 174 to the switch terminal 146, and current flows from this terminal to the motor 178 and to the ground lead 180 causing the wiper motor 178 to rotate and actuate the wipers in the conventional manner. When the rotatable member 66 of the handle assembly 50 is rotated to a third position, the rod 90 and flexible cable 98 rotate further causing the movable switch member 138 to rotate further and causing the contacts 172 to close and the contacts 174 to open. This produces high speed operation of the motor 178, which receives its voltage supply at its terminal connected to the switch terminal 150. If the push button 84 is depressed in opposition to the force of the compression spring 96, the rod 90 moves longitudinally in the conduit 18 to cause lineal movement of the movable switch member 138. This causes the switch contacts 170 to close, which, in turn, actuates the windshield washer pump motor 188.

When the rotatable member 66 of the handle assembly 50 is rotated back to its first position, the movable member 138 of the switch rotates in a corresponding manner and causes the contacts 176 to close and the contacts 174 and 172 to open. If the wipers at this instant are not in a "park" position, then the switch 182 is in contact with the terminal 186 and current flows through the fuse 164, terminal 144, the switch 182, and the closed contacts 176 to the low-speed switch terminal 146 to cause continued rotation of the motor 178 until the switch 182 returns to the position shown in the drawing.

Based upon the foregoing description of the invention, what is claimed is:

1. In a vehicle having a steering column, a switch assembly comprising, in combination;
    a post mounted on said steering column, said post being pivotal about an axis substantially parallel to the axis of said steering column said post having an arcuate passage extending through it;
    a shank coupled to and extending from said post, said shank when moved causing said post to pivot about said post axis, said shank having a passage within it, one end of said shank passage being in alignment with one end of said arcuate passage in said post;
    a rod within said shank passage;
    handle means coupled to said shank and to said rod, for controlling rotational and longitudinal movement of said rod within said shank passage;
    a switch having a housing mounted on said steering column in spaced relation with said post, said switch having a member capable of both rotary and lineal movement relative to said switch housing to change the switching condition of said switch;
    a conduit connected at one of its ends to said switch housing and at its other end to said post, said other end of said conduit being in alignment with the other end of said arcuate passage in said post; and
    a flexible cable coupled to said movable switch member and to said rod, said flexible cable extending through said conduit, through said arcuate passage in said post, and into said shank passage.

2. A switch assembly according to claim 1, wherein said handle means comprises a first member stationary with respect to said shank, said stationary first member having a circular flange, a second member rotatable on said circular flange of said stationary first member, said rotatable second member being coupled to said rod, rotation of said rotatable second member causing rotation of said rod.

3. A switch assembly according to claim 2, said handle assembly further comprising a push-button having a projecting portion, said rotatable second member having an opening receiving said projecting portion of said push-button, said push-button engaging said rod, said push-button being longitudinally movable within said rotatable second member and said push-button being coupled to said rotatable second member and said rod.

4. A switch assembly according to claim 2, wherein said post and said switch housing each have projecting flange portions and wherein said conduit has a conduit connector affixed to each of its ends, each of said conduit connectors having an ovally-shaped end portion for grasping said projecting flange portions, thereby, to couple said conduit to said post and said switch.

5. A switch assembly according to claim 3, wherein said post and said switch housing each have projecting flange portions and wherein said conduit has a conduit connector affixed to each of its ends, each of said conduit connectors having an ovally-haped end portion for grasping said projecting flange portions, thereby, to couple said conduit to said post and said switch.

6. A switch assembly according to claim 3, said switch assembly further comprising a turn signal switching mechanism coupled to said post, said switching mechanism having a member stationary relative to said steering column and a member movable in response to pivotal movement of said post about said post axis.

7. In a vehicle having a steering column, a switch assembly comprising, in combination:
- a post mounted on said steering column, said post being pivotal about an axis substantially parallel to the axis of said steering column, said post having an arcuate passage extending through it;
- a vehicle turn signal switch assembly comprising a first member stationary relative to said steering column, said stationary first member of said turn signal mechanism having a bearing, said post being journaled in said bearing, said turn signal mechanism having a second member coupled to said post for rotation with said post when said post rotates in said bearing to actuate said turn signal mechanism;
- a shank having a tubular construction and a passage extending through it, said shank having a collar larger in diameter than the remainder of said shank and having a projecting portion extending into said arcuate passage in said post;
- a shank sleeve surrounding said shank, abutting said collar, and in threaded engagement with said post to retain said shank on said post and to maintain said passage in said shank in alignment with one end of said arcuate passage in said post;
- a rod within said shank passage, said rod extending from said shank at the end of said shank opposite its end connected to said post;
- a handle assembly, said handle assembly comprising a conically-shaped first member in stationary engagement with said shank, said stationary first member having a circular flange and an opening defined by said circular flange, a second handle assembly member rotatable on said circular flange and relative to said stationary first member, said rotatable member having a projecting portion received in said opening in said stationary first member, said rotatable second member having an opening within it, a push-button having a projecting portion received by said opening in said rotatable second member and in non-rotatable engagement with the end of said rod extending from said shank, said projecting portion of said push-button and said opening in said rotatable second member permitting longitudinal movement, in the direction of the length of said rod, of said push-button and said rod and preventing rotational movement of said push-button relative to said rotatable second member, and means for limiting rotation of said rotatable second member relative to said stationary first member to less than one revolution;
- a switch having a housing mounted on said steering column and spaced from said post, said switch having a member capable of both rotary and lineal movement relative to said switch housing to change the switching condition of said switch;
- a conduit connected at one of its ends to said switch housing and at its other end to said post, said other end of said conduit being in alignment with the other end of said arcuate passage in said post; and
- a flexible cable coupled to said movable switch member and to said rod, said flexible cable extending through said conduit, through said arcuate passage in said post, and into said shank passage.

8. A switch assembly according to claim 7, wherein said means for limiting the rotation of said rotatable second member relative to said stationary first member comprises a groove in said projecting portion of said rotatable second member and a pin in said stationary first member, said pin being located in said groove.

* * * * *